(12) United States Patent
Teng et al.

(10) Patent No.: US 10,103,558 B2
(45) Date of Patent: Oct. 16, 2018

(54) CHARGER, CHARGING SYSTEM AND POWER TOOL WITH BATTERY PACK

(71) Applicant: CHERVON (HK) LIMITED, Wanchai (HK)

(72) Inventors: Zhihai Teng, Nanjing (CN); Yuexiang Zhang, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 96 days.

(21) Appl. No.: 15/077,254

(22) Filed: Mar. 22, 2016

(65) Prior Publication Data

US 2016/0294203 A1 Oct. 6, 2016

(30) Foreign Application Priority Data

Mar. 30, 2015 (CN) .......................... 2015 1 0145179

(51) Int. Cl.
*H02J 7/00* (2006.01)

(52) U.S. Cl.
CPC .......... *H02J 7/0045* (2013.01); *H02J 7/0013* (2013.01); *H02J 7/0042* (2013.01)

(58) Field of Classification Search
USPC ................. 320/107, 108, 109, 112, 113, 127
See application file for complete search history.

(56) References Cited

U.S. PATENT DOCUMENTS

| | | | | |
|---|---|---|---|---|
| 6,218,807 B1* | 4/2001 | Sakaue | ............... | H01M 2/1055 320/107 |
| 2003/0027037 A1* | 2/2003 | Moores, Jr. | ............. | B25F 5/008 429/82 |
| 2005/0202310 A1* | 9/2005 | Yahnker | ................... | B25F 5/008 429/62 |
| 2006/0214642 A1* | 9/2006 | Miyazaki | .............. | H02J 7/0042 320/150 |
| 2008/0311795 A1* | 12/2008 | Brotto | ..................... | B25F 5/029 439/628 |
| 2015/0084591 A1* | 3/2015 | Kishima | ............... | H02J 7/0013 320/112 |

* cited by examiner

*Primary Examiner* — Brian Ngo
(74) *Attorney, Agent, or Firm* — Greenberg Traurig, LLP (57) ABSTRACT

A electrical combination includes a battery pack and a charger. The battery pack includes a battery pack housing including a first connecting portion for connecting the battery pack to the charger and a vent for placing an inside and an outside of the battery pack housing into communication. Battery cells are disposed within the battery pack housing. The charger includes a charger housing including a second connecting portion for engaging with the first connecting portion and an air flue having an air inlet and an air outlet, and a fan disposed within the charger housing. When the battery pack is connected to the charger, the air inlet is connected with the vent of the battery pack and the battery pack is positioned between the air outlet and the second connecting portion.

9 Claims, 6 Drawing Sheets

CHARGER, CHARGING SYSTEM AND POWER TOOL WITH BATTERY PACK

RELATED APPLICATION INFORMATION

This application claims the benefit under 35 U.S.C. § 119(a) of Chinese Patent Application No. CN 201510145179.4, filed on Mar. 30, 2015, the disclosure of which is incorporated herein by reference in its entirety.

FIELD OF THE DISCLOSURE

The present disclosure relates generally to charging devices and, more particularly, to a charger, a charging system and a power tool with a battery pack.

BACKGROUND OF THE DISCLOSURE

High-powered chargers and battery packs have an over-temperature prevention system. With this over-temperature prevention system, the battery pack cannot be charged by the charger when the temperature of the battery cells is greater than a preset value. So the battery pack must be cooled. When the temperature of the battery pack is decreased to less than or equal to the present value, it can be charged. However, the cooling process generally requires a long time, and the battery pack cannot be charged quickly. Further, during the discharging process, the temperature of the battery pack may rise quickly, and the high temperature may reduce the useful life of the battery pack.

The statements in this section merely provide background information related to the present disclosure and may not constitute prior art.

SUMMARY

In one aspect of the disclosure, an electrical combination includes a battery pack and a charger. The battery pack includes a battery pack housing including a first connecting portion for connecting the battery pack to the charger and a vent for placing an inside and an outside of the battery pack housing into communication. Battery cells are disposed within the battery pack housing. The charger includes a charger housing including a second connecting portion for engaging with the first connecting portion and an air flue having an air inlet and an air outlet, and a fan disposed within the charger housing. When the battery pack is connected to the charger, the air inlet is connected with the vent of the battery pack and the battery pack is positioned between the air outlet and the second connecting portion.

In another aspect of the disclosure, an electrical combination includes a battery pack and a charger. The battery pack includes a battery pack housing including a first connecting portion for connecting the battery pack to the charger and a vent for placing an inside and an outside of the battery pack housing into communication. Battery cells are disposed within the battery pack housing. The charger includes a charger housing including a second connecting portion for engaging with the first connecting portion and an air flue having an air inlet and an air outlet, and a fan disposed within the charger housing. When the battery pack is connected to the charger, the air inlet is connected with the vent of the battery pack and the air inlet and air outlet are respectively positioned on two sides of the battery cells.

In yet another aspect of the disclosure, an electrical combination includes a battery pack and a charger. The battery pack includes a battery pack housing including a first connecting portion for connecting the battery pack to the charger and a vent for placing an inside and an outside of the battery pack housing into communication. Battery cells are disposed within the battery pack housing. The charger includes a charger housing including a second connecting portion for engaging with the first connecting portion and an air flue having an air inlet and an air outlet, and a fan disposed within the charger housing. When the battery pack is connected to the charger, the air inlet is connected with the vent of the battery pack and the air sucked by the fan is guided to the air outlet by the air flue so that the air at least partially flows through the outside of the battery pack.

In yet another aspect of the disclosure, an electrical combination includes a battery pack and a charger. The battery pack includes a battery pack housing including a first connecting portion for connecting the battery pack to the charger and a vent for placing an inside and an outside of the battery pack housing into communication. Battery cells are disposed within the battery pack housing. The battery pack can be connected to the charger along a first direction. The charger includes a charger housing. The charger housing includes a second connecting portion for engaging with the first connecting portion, an air flue having an air inlet and an air outlet, and an air duct including at least a duct wall substantially perpendicular to the first direction. A fan is disposed within the charger housing. When the battery pack is connected to the charger, the air outlet is at least partially beyond the battery pack.

In yet another aspect of the disclosure, a charger for charging a battery pack includes a charger housing. The charger housing includes a charger connecting portion for connecting with the battery pack, an air flue having an air inlet and an air outlet, a first wall extending in a first direction and forming the charger connecting portion, and a second wall extending in a second direction and forming the air outlet. The second direction is substantially perpendicular to the first direction. A fan is disposed within the charger housing.

In yet another aspect of the disclosure, a power tool with a battery pack is provided. The battery pack includes a battery pack housing including a first connecting portion for connecting the battery pack to the charger and a vent for placing an inside and an outside of the battery pack housing into communication. Battery cells are disposed within the battery pack housing. The power tool includes a power tool housing including a second connecting portion for engaging with the first connecting portion and an air flue having an air inlet and an air outlet, and a fan disposed within the power tool housing. When the battery pack is connected to the power tool, the air inlet is connected with the vent of the battery pack and the battery pack is positioned between the air outlet and the second connecting portion.

Further areas of applicability will become apparent from the description provided herein. It should be understood that the description and specific examples are intended for purposes of illustration only and are not intended to limit the scope of the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of embodiments is merely exemplary in nature and is in no way intended to limit the scope of the invention hereinafter claimed, its application, or uses.

Referring to FIGS. 1-6, an electrical combination 1 includes a battery pack 10 and a charger 20. The battery pack 10 includes a battery pack housing 11 and battery cells 12. The charger 20 includes a charger housing 21 and a fan 22. The battery pack housing 11 includes a first connecting portion 111 for connecting the battery pack 10 to the charger 20. The battery pack housing 11 further includes a vent 112 for placing an inside and an outside of the battery pack housing 11 into fluid communication. The battery cells 12 are disposed within the battery pack housing 11 for storing electric power. The charger housing 21 includes a second connecting portion 211 for engaging with the first connecting portion 111. When the battery pack 10 is connected to the charger 20 through the engagement between the first and second connecting portion 111, 211, the battery pack 10 can be charged by the charger 20. The fan 22 is disposed within the charger housing 21 for cooling the battery pack 10. The charger housing 21 further includes an air flue 212. The air flue 212 has an air inlet 212a and an air outlet 212b. When the battery pack 10 is connected to the charger 20, the air inlet 212a is placed into fluid communication, e.g., connected, with the vent 112 of the battery pack 10, and the battery pack 10 is between the air outlet 212b and the second connecting portion 211.

After a discharging process of the battery pack 10, the battery pack 10 needs to be charged. At this moment, the temperature of the battery cells 12 is high due to the discharging process. It is to be understood that, for the high-powered charger 20, the charger 20 and the battery pack 10 generally have an over-temperature prevention system. With this over-temperature prevention system, the battery pack 10 cannot be charged by the charger 20 or discharged when the temperature of battery cells 12 is greater than a preset value. So the battery pack 10 must be cooled. When the temperature of the battery pack 10 is decreased to less than or equal to the present value, it can be charged. However, a cooling process generally requires a long time, and the battery pack 10 cannot be charged quickly. In this application, the charger 20 includes the fan 22. When the battery pack 10 is connected to the charger 20, the fan 22 starts to operate. The hot air in the battery pack 10 is sucked out from the vent 112 and flows into the charger 20 through the air inlet 212a, so that the battery pack 10 is cooled. Meanwhile, the air is blown out from the air outlet 212b toward the battery pack 10 so as to further cool the battery pack 10. Thus, the battery pack 10 is cooled effectively and quickly under the air sucking and air blowing action, and the temperature of the battery pack 10 can be quickly decreased to below the present value so as to allow the charging. Otherwise, during a charging process, the temperature of the battery pack 10 can be restrained to rise due to the fan 22 so the battery pack 10 may be avoided from damage, and the charging process may not be stopped due to the temperature of the battery cells 12 reaching the present value as the battery pack 10 is protected by the over-temperature protection system.

Figure 1:
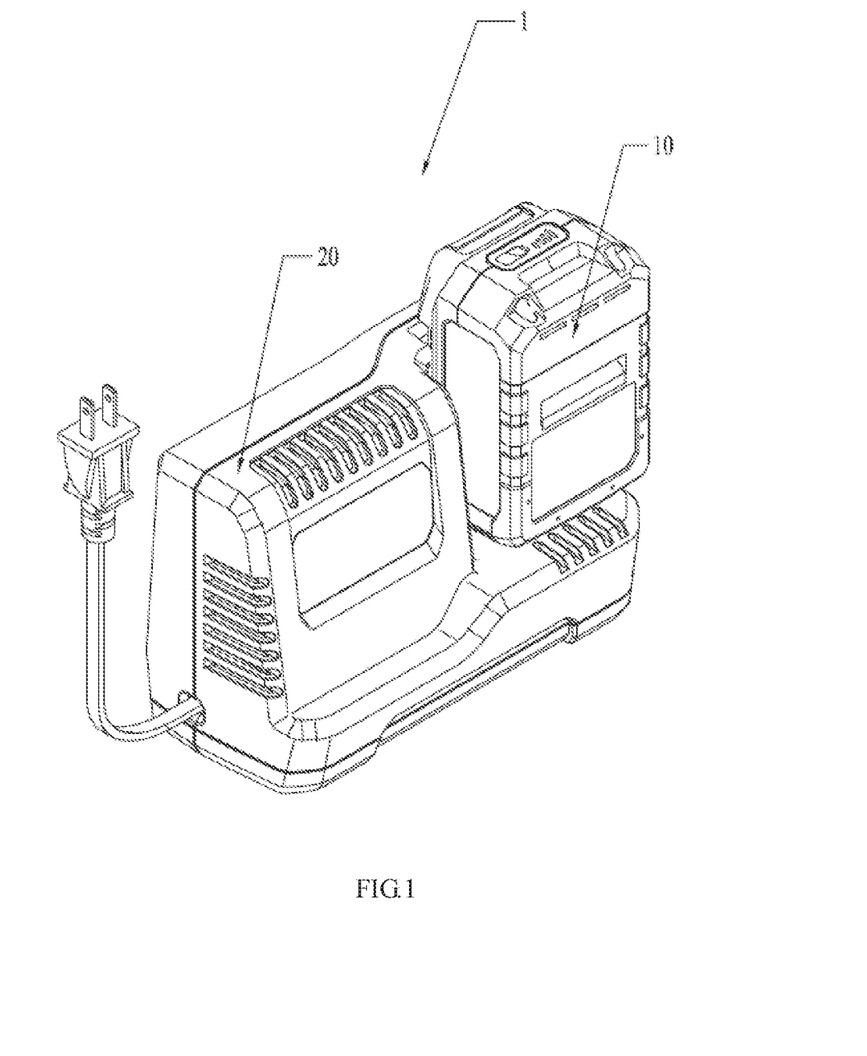
FIG. 1 is a schematic view of an exemplary electrical combination.
Figure 2:
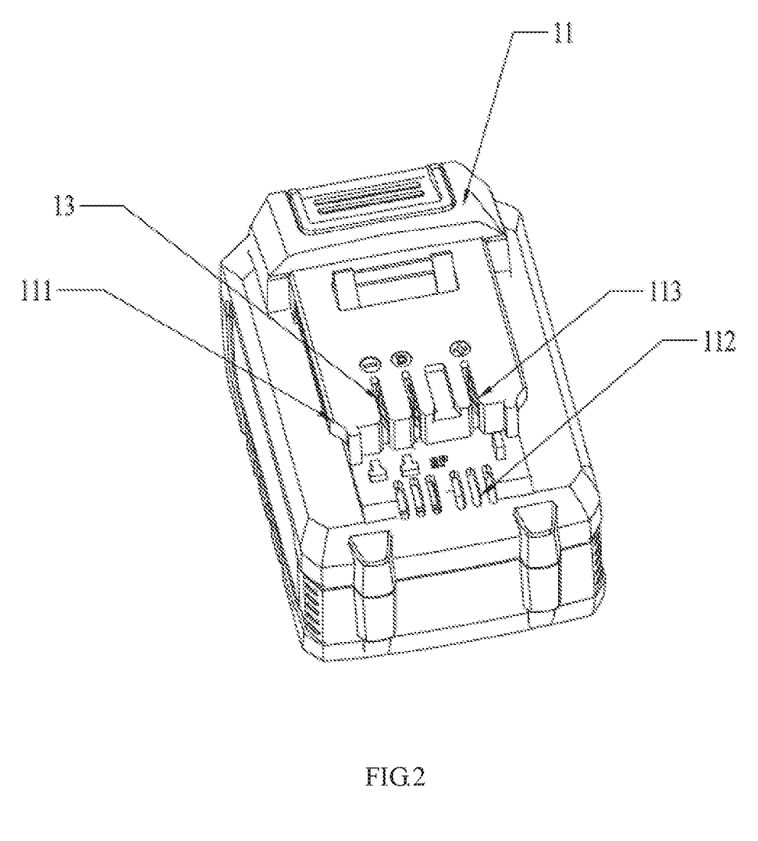
FIG. 2 is a schematic view of an exemplary battery pack.
Figure 3:
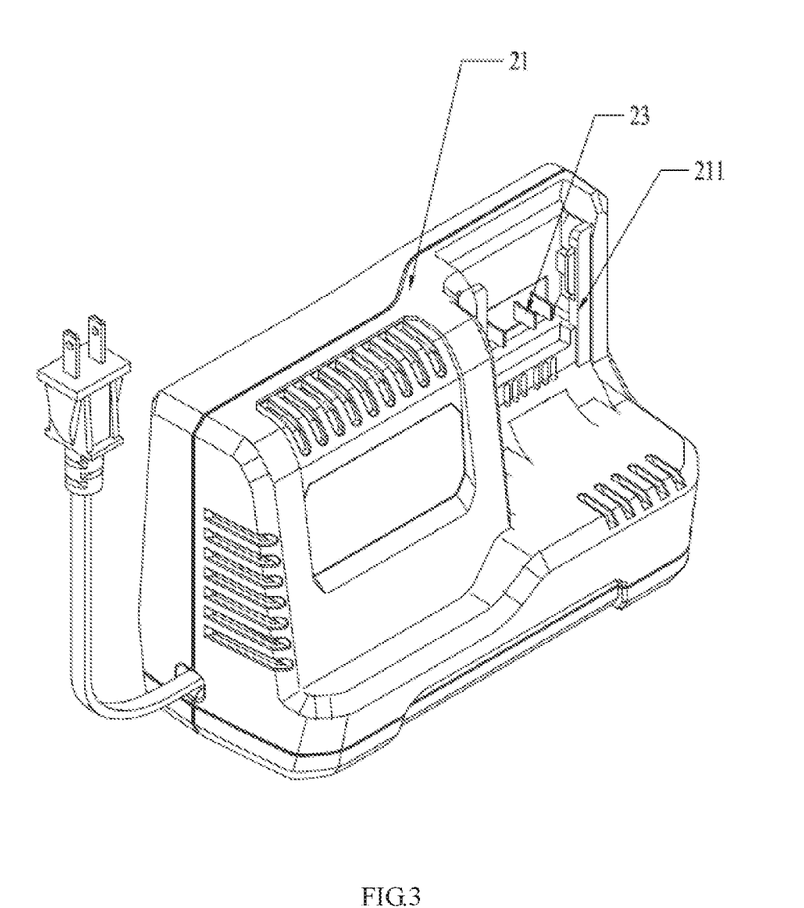
FIG. 3 is a schematic view of an exemplary charger.
Figure 4:
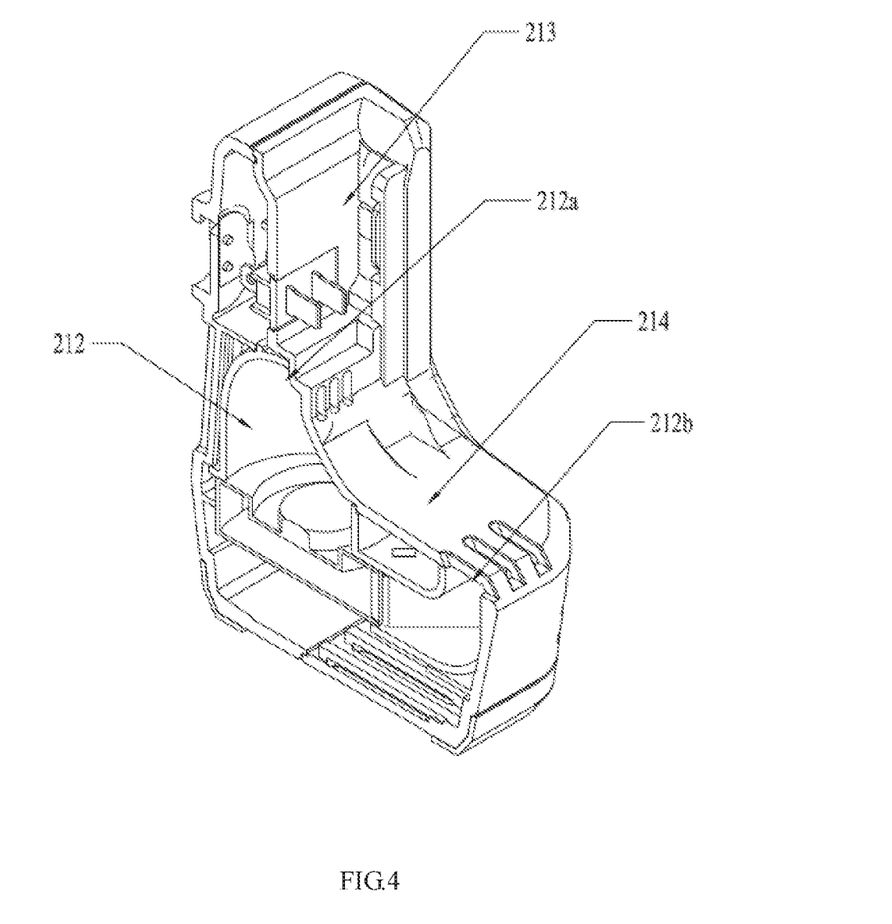
FIG. 4 is a sectional view of the charger in FIG. 3.
Figure 5:
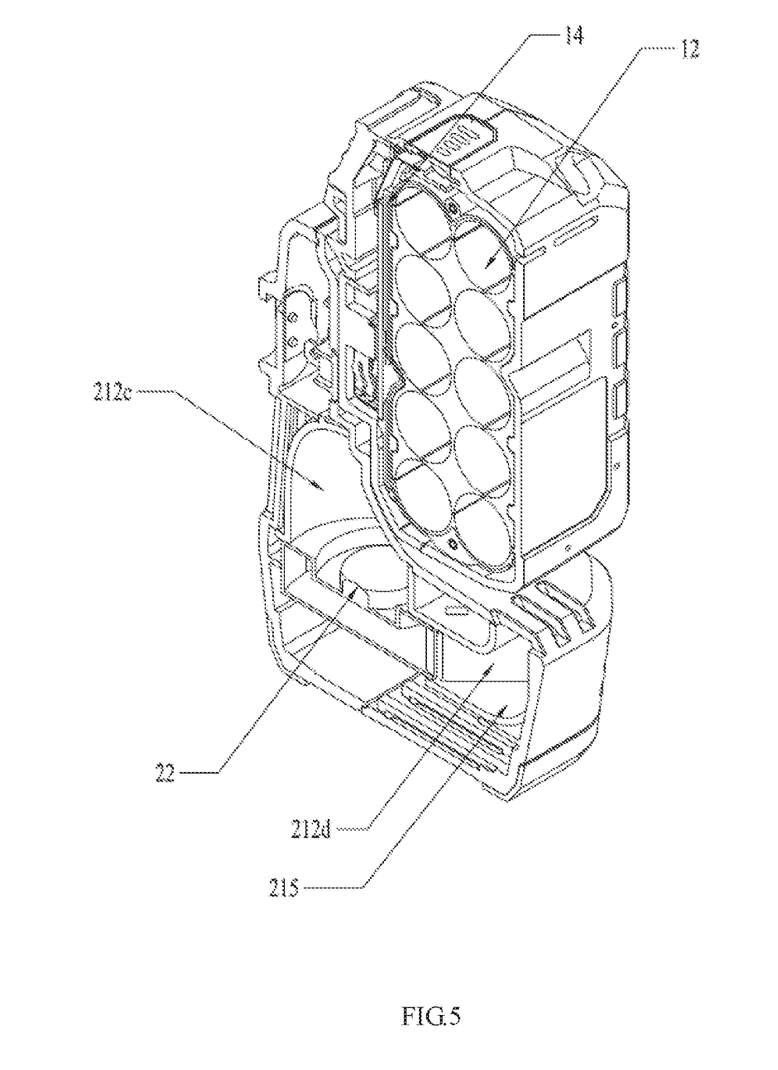
FIG. 5 is a sectional view of the electrical combination in FIG. 1.
Figure 6:
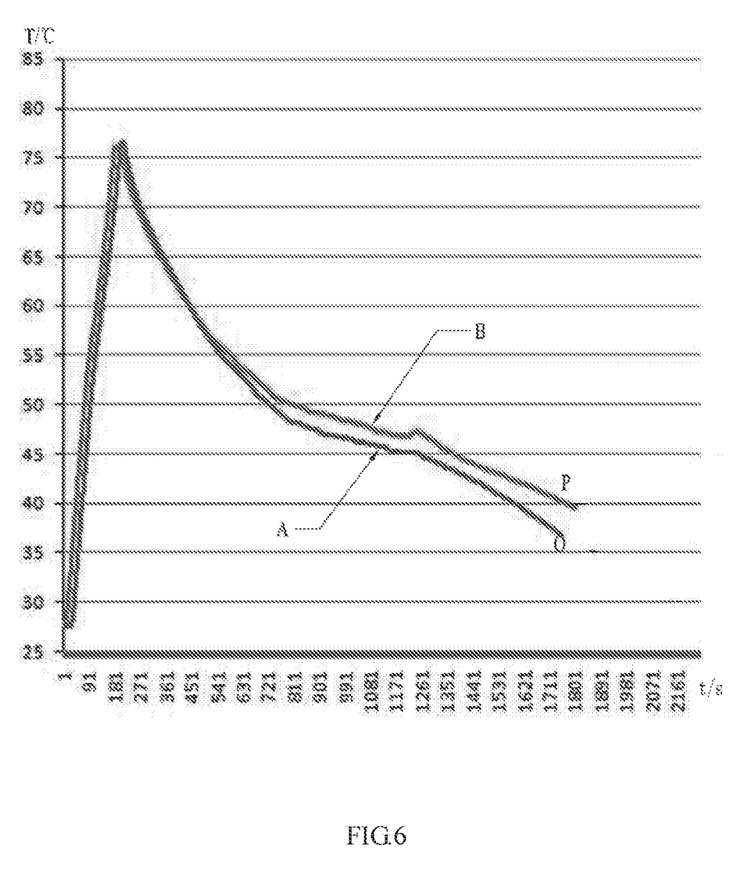
FIG. 6 is a temperature-time graph of the battery pack.

Shown in FIG. 6 is a temperature-time graph of the battery pack 10. Curve A shows that when an ambient temperature is 23 degrees C., the battery pack 10 with 5 Ah capacity is discharged with 40 A discharge current, and a discharge cut-off voltage is set as 13.5V. After discharging, the battery pack 10 is connected to the charger 20, and meanwhile the fan 22 of the charger 20 is activated to cool the battery pack 10. The temperature of the battery cells 12 is monitored and sampled so as to obtain the temperature-time curve A. Curve B shows that when the ambient temperature is 23 degrees C., the battery pack 10 with 5 Ah capacity is discharged with 40 A discharge current, and a discharge cut-off voltage is set as 13.5V. After discharging, the battery pack 10 is connected to the charger 20, and meanwhile the fan 22 of the charger 20 is turned off. The temperature of the battery cells 12 is monitored and sampled so as to obtain the temperature-time curve B. As shown in FIG. 6, the temperature of curve A at point O is about 36 degrees C., and the temperature of curve B at point P is about 40 degrees C., point P and point O are on the same time axis. Thereby, in the application, the battery pack 10 can be cooled by the charger 20 quickly, the waiting time for charging is decreased, and the working efficiency is improved.

The battery pack 10 includes battery pack terminals 13 and a circuit board 14. The charger 20 includes charger terminals 23. The battery pack terminals 13 are at least partially contained within the battery pack housing 11. The charger terminals 23 are able to be inserted into the battery pack housing 11 and connect with the battery pack terminals 13. The battery pack housing 11 includes a terminal interface 113 allowing the charger terminals 23 to be inserted. The terminal interface 113 is disposed on one side of the battery pack housing 11 to which the charger 20 is connected. The circuit board 14 is disposed within the battery pack housing 11 and electrically connected to the battery cells 12.

The charger housing 21 includes a first wall 213 and a second wall 214. The first wall 213 is extended in a first direction and forms the second connecting portion 211 for connecting with the battery pack 10. The second wall 214 is extended in a second direction which is substantially perpendicular to the first direction and is formed with the air outlet 212b.

The first connecting portion 111 is disposed on a first side of the battery pack housing 11, and the vent 112 is also disposed on the same first side. When the battery pack 10 is connected to the charger 20, a second side of the battery pack housing 11 that is opposite to the first side is positioned between the air outlet 212b and the first connecting portion 111. With this arrangement, when the battery pack 10 is connected to the charger 20, the fan 22 of the charger 20 is started to rotate. Because the vent 112 is disposed on the first side of the batter pack housing 11 on which the first connecting portion 111 is disposed, and also on which the charger 20 is connected, while the second side of the battery pack housing 11 that is opposite to the vent 112 is positioned between the air outlet 212b and the first connecting portion 111, the air at the first side of the battery pack housing 11 is sucked out through the vent 112 and the air inlet 212a. Meanwhile, the air is blown from the air outlet 212a toward the second side of the battery pack housing 11. Thus, a cyclic cooling air flow is formed between the two sides of the battery pack housing 11, and the battery pack 10 can be heat dissipated equally. Otherwise, the second side of the battery pack housing 11 is positioned between the air outlet 212b and the first connecting portion 111, so the air flowing out from the air outlet 212b is directly blown toward to the battery pack housing 11. Thereby, the cooling effect is further improved, and the waiting time for charging is shortened.

Preferably, the air flue 212 includes an air-suction flue 212c and an air-blowing flue 212d. The fan 22 disposed in the air flue 212 divides the air flue 212 into two parts, the air-suction flue and air-blowing flue 212c, 212d. The air-suction flue 212c is positioned on a first side of the fan 22, and the air-blowing flue 212d is positioned on a second side of the fan 22. When the battery pack 10 is connected to the charger 20, the air inlet 212a is connected with the vent 112 of the battery pack 10, and the air inlet 212a and the air outlet 212b are respectively positioned on two sides of the battery cells 12. Thus, the cooling air flow is formed on the two sides of the battery cells 12, and the battery cells 12 can be heat dissipated equally.

Otherwise, when the battery pack 10 is connected to the charger 20, the air inlet 212a is connected with the vent 112 of the battery pack 10, the air sucked by the fan 22 is guided to the air outlet 212b by the air flue 212, so that the air is passed through the outside of the battery pack 10. So the air flow is formed between the inside and outside of the battery pack 10 through sucking the air in the battery pack 10 and blowing to the outside of the battery pack 10. The cooling effect of the battery pack 10 is improved further.

Otherwise, the battery pack 10 is able to connect to the charger 20 along the first direction. The charger housing 21 includes an air duct. The air duct includes at least a duct wall 215 that is substantially perpendicular to the first direction. The air outlet 212b is formed on an end of the duct wall 215. When the battery pack 10 is connected to the charger 20 along the first direction, the air inlet 212a is connected with the vent 112 of the battery pack 10, and the air outlet 212b at least partially extends beyond the battery pack 10. The air in the battery pack 10 can be sucked through the connection between the air inlet 212a and vent 112. The air flow is formed between the inside and outside of the batter pack 10 because the air outlet 212b is at least partially beyond the battery pack 10 and the air can be blown toward the outside of the battery pack 10. So the cooling effect of the battery pack 10 is improved further.

The subject system is further useful with a power tool having a battery pack. Here the power tool is electrically connected with the battery pack and powered by the battery pack, which is not limited to the battery pack being disposed within the power tool or the battery pack cannot be separated from the power tool. The battery pack includes a battery pack housing and battery cells. The power tool includes a power tool housing and a fan. The battery pack housing includes a first connecting portion for connecting the battery pack to the power tool. The battery pack housing includes a vent for communicating an inside and an outside of the battery pack. The battery cells are disposed within the battery pack housing for storing electric power. The power tool housing includes a second connecting portion for engaging with the first connecting portion. When the first connecting portion is engaged with the second connecting portion, the battery pack is connected to the power tool and provides power to the power tool. The fan is disposed in the power tool housing for cooling the battery pack. The power tool housing further includes an air flue. The air flue has an air inlet and an air outlet. When the battery pack is connected to the power tool, the air inlet is connected with the vent of the battery pack, and the battery pack is positioned between the air outlet and the second connecting portion.

When the battery pack is connected to the power tool, the temperature of the battery cells is high because the charging process of the battery pack is just finished or the battery pack is discharged with a large discharging current. It is to be understood that the high-powered power tool powered by the battery pack usually has an over-temperature prevention system. With this over-temperature prevention system, the power tool cannot be powered by the battery pack when the temperature of the battery cells is higher than a preset value. So the battery pack must be cooled. When the temperature of the battery pack is decreased to less than or equal to the present value, it can supply power to the power tool. However, the cooling process usually spends a long time, and the power tool cannot be operated quickly. In this application, the power tool includes the fan. When the battery pack is connected to the power tool, the fan is activated. The hot air in the battery pack is sucked out through the vent and the air inlet so as to cool the battery pack. Meanwhile, the air is blown toward the battery pack through the air outlet so as to further cool the battery pack. Thus, the battery pack is heat dissipated well under the air sucking and air blowing action. The temperature of the battery cells can be decreased to the present value quickly so that the battery pack can supply power to the power tool. Otherwise, during a power supplying process, the temperature of the battery cells can be restrained to rise so as to avoid the battery pack from damage, and the power supply process cannot be stopped due to the temperature of the battery cells reaching the present value as the battery pack is protected by the over-temperature system.

Preferably, the air flue of the power tool includes an air-suction flue and an air-blowing flue. The fan disposed within the air flue divides the air flue as two parts, the air-suction flue and air-blowing flue. The air-suction flue is positioned on one side of the fan, and the air-blowing flue is positioned on the other side of the fan.

Thus, from the foregoing, it will be understood that the power tool can be provided with the features and functionalities that have been illustrated and described with respect to the battery charger for charging and using a battery pack therewith.

The above illustrates and describes basic principles, main features and advantages of the present invention. Those skilled in the art should appreciate that the above embodiments do not limit the invention hereinafter claimed in any form. Technical solutions obtained by equivalent substitution or equivalent variations all fall within the scope of the present invention.

What is claimed is:

1. An electrical combination, comprising:
   a battery pack, the battery pack comprising:
   a battery pack housing having a first connecting portion and defining a vent for communicating an inside and an outside of the battery pack housing; and
   a plurality of battery cells disposed within the battery pack housing; and
   a charger for charging the battery pack, the charger comprising:
   a charger housing comprising a second connecting portion for engaging with the first connecting portion and defining an air flue having an air inlet and an air outlet, and the charger housing further defining an area for disposing the battery pack; and
   a fan disposed within the charger housing, wherein, when the fan rotates, a cooling air flow can be generated that flows first through the battery cells, then flows through the fan, then flows to an outer wall of the battery pack, and then at least partly flows to the area for disposing the battery pack such that the cooling air leaving the battery pack flows through the charger and the area for disposing the battery pack;

when the battery pack is connected to the charger, the air inlet is connected to the vent of the battery pack and the battery pack is positioned between the air outlet and the second connecting portion.

2. The electrical combination of claim 1, wherein the first connecting portion is disposed on a first side of the battery pack housing and, when the battery pack is connected to the charger, a second side of the battery pack housing opposite to the first side is positioned between the air outlet and the first connecting portion.

3. The electrical combination of claim 1, wherein the vent is disposed on a first side of the battery pack housing and, when the battery pack is connected to the charger, a second side of the battery pack housing opposite to the first side is positioned between the air outlet and the first connecting portion.

4. The electrical combination of claim 1, wherein the battery pack comprises battery pack terminals which are at least partially disposed within the battery pack housing, the charger comprises charger terminals which are insertable into the battery pack terminals, the battery pack housing comprises a terminal interface for receiving the charger terminals, the terminal interface is disposed on a first side of the battery pack housing and, when the battery pack is connected to the charger, a second side of the battery pack housing opposite to the first side is positioned between the air outlet and the first connecting portion.

5. The electrical combination of claim 1, wherein the battery pack comprises a circuit board electrically connected with the battery cells, the circuit board is disposed on a first side of the battery pack housing and, when the battery pack is connected to the charger, a second side of the battery pack housing opposite to the first side is positioned between the air outlet and the first connecting portion.

6. An electrical combination, comprising:
a battery pack; and
a charger for charging the battery pack;
wherein the battery pack comprises:
a battery pack housing comprising a first connecting portion for connecting the battery pack to the charger and a vent for placing an inside and an outside of the battery pack housing into communication; and
a plurality of battery cells disposed within the battery pack housing;
wherein the charger comprises:

a charger housing comprising a second connecting portion for engaging with the first connecting portion and an air flue having an air inlet and an air outlet, and the charger housing further defining an area for disposing the battery pack; and a fan disposed within the charger housing, wherein, when the fan rotates, a cooling air flow can be generated that flows first through the battery cells, then flows through the fan, then flows to an outer wall of the battery pack, and then at least partly flows to the area for disposing the battery pack such that the cooling air leaving the battery pack flows through the charger and the area for disposing the battery pack;

wherein, when the battery pack is connected to the charger, the air inlet is connected with the vent of the battery pack and the air inlet and air outlet are respectively positioned on two sides of the battery cells.

7. The electrical combination of claim 6, wherein, when the battery pack is connected to the charger, the air inlet is connected with the vent of the battery pack and the air sucked by the fan is guided to the air outlet by the air flue so that the air at least partially flows through the outside of the battery pack.

8. The electrical combination of claim 6, wherein, when the battery pack is connected to the charger along a first direction, the air inlet is connected with the vent of the battery pack and the air outlet extends at least partially beyond the battery pack.

9. A charger for charging a battery pack, comprising:
a charger housing, and the charger housing further defining an area for disposing the battery pack comprising:
a charger connecting portion for connecting with the battery pack;
an air flue having an air inlet and an air outlet;
a first wall extending in a first direction and forming the charger connecting portion; and
a second wall extending in a second direction and forming the air outlet,
wherein the second direction is substantially perpendicular to the first direction and wherein the charger housing further defines an area for disposing the battery pack; and a fan disposed with the charger housing, wherein, when the fan rotates, a cooling air flow can be generated that flows first through the battery cells, then flows through the fan, then flows to an outer wall of the battery pack, and then at least partly flows to the area for disposing the battery pack such that the cooling air leaving the battery pack flows through the charger and the area for disposing the battery pack.

* * * * *